US010053023B2

(12) United States Patent
Nero

(10) Patent No.: US 10,053,023 B2
(45) Date of Patent: Aug. 21, 2018

(54) CHAIN RETENTION APPARATUS

(71) Applicant: Marc Nero, St. Marys, PA (US)

(72) Inventor: Marc Nero, St. Marys, PA (US)

(73) Assignee: Nero Enterprises, LLC, St. Marys, PA (US)

(*) Notice: Subject to any disclaimer, the term of this patent is extended or adjusted under 35 U.S.C. 154(b) by 31 days.

(21) Appl. No.: 15/200,187

(22) Filed: Jul. 1, 2016

(65) Prior Publication Data
US 2018/0001838 A1    Jan. 4, 2018

(51) Int. Cl.
*B60R 9/06*    (2006.01)
*B60R 11/06*   (2006.01)
*B60R 11/00*   (2006.01)

(52) U.S. Cl.
CPC ........... *B60R 11/06* (2013.01); *B60R 9/06* (2013.01); *B60R 9/065* (2013.01); *B60R 2011/0084* (2013.01); *B60R 2011/0096* (2013.01)

(58) Field of Classification Search
CPC ... B60R 9/065; B60R 2011/0084; B60R 9/06; A47B 2210/0037; A47B 2210/0043
USPC ............ 224/311; 296/37.6; 414/462, 664; 211/162, 172
See application file for complete search history.

(56) References Cited

U.S. PATENT DOCUMENTS

| 356,125 A | * | 1/1887 | Holzhalb | A47G 25/746 211/85.3 |
|---|---|---|---|---|
| 1,132,190 A | * | 3/1915 | Kohout | A47G 25/746 211/85.3 |
| 1,415,316 A | * | 5/1922 | Corbin | A47B 61/02 211/85.3 |
| 2,846,079 A | * | 8/1958 | Leeper | B60P 3/05 211/1.57 |
| 3,050,348 A | * | 8/1962 | Pipe | A47B 88/493 312/334.13 |
| 3,485,539 A | * | 12/1969 | Vaughn | A47B 88/493 384/19 |
| 3,754,664 A | * | 8/1973 | Kotkins | A45C 3/004 211/94.01 |
| 3,893,500 A | | 7/1975 | Planz | |
| 3,954,182 A | * | 5/1976 | McEvers | A47B 61/02 211/105.3 |
| 4,210,036 A | | 7/1980 | Nakata | |
| 4,248,399 A | | 2/1981 | Gipson | |

(Continued)

FOREIGN PATENT DOCUMENTS

JP    3034759    3/1997

OTHER PUBLICATIONS

Quality Chain CH-1 Truck Tire Chain Storage Hanger (Universal), 2016, 1 page.

*Primary Examiner* — Justin Larson
(74) *Attorney, Agent, or Firm* — RatnerPrestia

(57) ABSTRACT

A chain retention device includes a track member configured to be mounted on an external surface of a vehicle. The track member includes at least two guide surfaces which extend along the track member and a first set of rollers mounted on the track member between the at least two guide surfaces. The chain retention device also includes an elongated arm including a second set of rollers and one or more chain support surfaces. The elongated arm is positioned between the at least two guide surfaces such that the second set of rollers is in contact with the track member, and the first set of rollers is in contact with the elongated arm.

22 Claims, 5 Drawing Sheets

(56) References Cited

U.S. PATENT DOCUMENTS

| | | | | |
|---|---|---|---|---|
| D273,645 S * | 5/1984 | McEvers | | D6/513 |
| 4,705,315 A * | 11/1987 | Cherry | | B60R 11/06 |
| | | | | 296/24.45 |
| 5,172,952 A * | 12/1992 | Lasnetski | | B60R 5/006 |
| | | | | 182/127 |
| 5,316,191 A | 5/1994 | Gibson | | |
| 5,632,591 A * | 5/1997 | Henriquez | | B60P 3/14 |
| | | | | 182/127 |
| 5,862,926 A * | 1/1999 | Johnson | | B60P 1/5442 |
| | | | | 212/180 |
| 5,899,655 A * | 5/1999 | Miller | | B60P 3/07 |
| | | | | 224/510 |
| 6,250,483 B1 * | 6/2001 | Frommer | | A22B 5/06 |
| | | | | 212/180 |
| 6,428,263 B1 * | 8/2002 | Schellens | | B60R 9/042 |
| | | | | 224/310 |
| 6,681,970 B2 * | 1/2004 | Byrnes | | B60R 9/042 |
| | | | | 224/310 |
| 6,719,158 B2 * | 4/2004 | Goldberg | | A47G 25/0692 |
| | | | | 211/105.1 |
| 6,976,595 B1 * | 12/2005 | Geller | | A47F 5/0838 |
| | | | | 211/124 |
| 7,048,491 B2 * | 5/2006 | Windbergs | | B66C 9/08 |
| | | | | 212/312 |
| 7,111,884 B2 * | 9/2006 | Johnson | | B60P 3/14 |
| | | | | 296/26.1 |
| 7,152,838 B2 * | 12/2006 | Taulbee | | B60P 3/36 |
| | | | | 248/304 |
| 7,165,684 B2 * | 1/2007 | Ferron | | B62H 3/12 |
| | | | | 211/118 |
| 7,318,363 B1 | 1/2008 | Barber | | |
| 7,748,943 B2 * | 7/2010 | Studer | | B60P 1/4435 |
| | | | | 414/542 |
| 8,714,054 B1 | 5/2014 | Hiles | | |
| 8,757,614 B2 * | 6/2014 | Okamoto | | A47B 88/0466 |
| | | | | 271/145 |
| 8,905,455 B2 * | 12/2014 | Renfro | | A47B 88/14 |
| | | | | 224/564 |
| 8,925,777 B1 * | 1/2015 | Casucci | | B60R 9/065 |
| | | | | 224/404 |
| 8,973,766 B2 | 3/2015 | Sprang, Jr. | | |
| 9,060,467 B2 * | 6/2015 | Nee | | A47G 7/045 |
| 2005/0173606 A1 * | 8/2005 | Taulbee, III | | B60P 3/36 |
| | | | | 248/310 |
| 2005/0184116 A1 * | 8/2005 | Jury | | B60R 7/08 |
| | | | | 224/311 |
| 2007/0059136 A1 * | 3/2007 | Schlangen | | B60P 1/4421 |
| | | | | 414/467 |
| 2012/0055968 A1 | 3/2012 | Parker | | |
| 2016/0009231 A1 | 1/2016 | Perron | | |
| 2016/0101740 A1 * | 4/2016 | Patton | | B60P 3/077 |
| | | | | 414/462 |

* cited by examiner

CHAIN RETENTION APPARATUS

FIELD OF THE INVENTION

This invention relates to devices for retaining chains and, more particularly, for retaining tire chains on a device configured to be mounted on a vehicle.

BACKGROUND OF THE INVENTION

Tire chains are automotive accessories which may be affixed to the external surface of vehicle tires in order to provide for additional traction on soft or otherwise slippery transit surfaces. Commonly employed on large tractor-trailer trucks and construction vehicles, tire chains are required by law in many jurisdictions to be utilized by various classes of commercial vehicles during hazardous driving conditions.

Chains may also be used on vehicles for load bearing applications, such as to secure an asset to the bed of a truck.

Storage of vehicular chains, and especially tire chains or load bearing chains which have become fouled by environmental elements such as dirt, mud, and other particulate matter deposited on the chains during transit, can be cumbersome. Once removed from the vehicle, drivers are often faced with the undesirable choice of storing chains inside the vehicle, thereby soiling the interior of the vehicle, or leaving the chains outside of the cab, thereby avoiding spoliation of the interior but rendering the tire chains visible, unsecured, and at risk of theft. Moreover, storage of chains external to the vehicle continually exposes the chains so stored to environmental elements, thereby accelerating the degradation of the chains.

SUMMARY OF THE INVENTION

Aspects of the invention relate to chain retention devices.

In accordance with one aspect, the invention provides a chain retention device for a vehicle. The chain retention device includes a track member configured to be mounted on an external surface of a vehicle. The track member includes at least two guide surfaces which extend for a distance along the track member and a first set of rollers mounted on the track member between the at least two guide surfaces. An elongated arm that is slidably mounted on the track member includes a second set of rollers and one or more chain support surfaces for supporting a chain mounted thereon is positioned between the at least two guide surfaces such that the second set of rollers is in contact with the track member, and the first set of rollers is in contact with the arm.

In accordance with another aspect, the invention provides a chain retention device for a vehicle. The chain retention device includes a support base that is configured to be mounted to an external surface of a vehicle. The chain retention device further includes two support members having proximal ends extending from the support base, the support members oriented in parallel relationship to each other, each support member including a guide surface, and a support roller. The chain retention device further includes an elongated arm including a set of rollers and one or more chain support surfaces for receiving chains mounted thereon. The set of rollers contact the two support members and the support rollers contact the arm, thereby maintaining the arm between the two support members.

In accordance with yet another aspect, the invention provides a chain retention device. The chain retention device includes a support base configured to be mounted to an external surface of a vehicle. The chain retention device further includes two support members having proximal ends extending from the support base in parallel relationship, each support member including a guide surface, and a support roller. The chain retention device further includes an elongated arm including a set of rollers and one or more chain support surfaces for receiving chains mounted thereon. The set of rollers contact the two support members and the support rollers contact the arm, thereby maintaining the arm between the two support members. An enclosure includes a door for accessing the elongated arm.

It is to be understood that both the foregoing general description and the following detailed description are exemplary, but are not restrictive, of the invention.

BRIEF DESCRIPTION OF THE DRAWINGS

The invention is best understood from the following detailed description when read in connection with the accompanying drawings, with like elements having the same reference numerals. When a plurality of similar elements are present, a single reference numeral may be assigned to the plurality of similar elements with a small letter designation referring to specific elements. When referring to the elements collectively or to a non-specific one or more of the elements, the small letter designation may be dropped. This emphasizes that according to common practice, the various features of the drawings are not drawn to scale unless otherwise indicated. On the contrary, the dimensions of the various features may be expanded or reduced for clarity. Included in the drawings are the following figures.

DETAILED DESCRIPTION OF THE INVENTION

Aspects of the invention are directed to chain retention devices.

Described herein is a chain retention device which is: 1) structurally robust enough to bear the significant load of a plurality of sets of chains in both storage (retracted) and loading (extended) positions; 2) conveniently mounted to an accessible external surface of the vehicle; 3) sheltered from exposure to environmental elements, thereby preventing undue degradation of tire chains when not in use; 4) protective of the vehicle by preventing stored chains from contacting and damaging vehicle tires, fuel tanks, or other areas during transit; and 5) securable, thereby protecting the chains, when not in use, from tampering and/or theft.

With respect to load bearing chains, previously vehicle operators would have to store these chains on the top of, e.g., a tractor trailer. Climbing to the roof of such a vehicle presents an inherent danger of injury due to falling. The chain retention device avoids this risk through convenient and ground-level access to chain storage.

As used herein, "vehicle" means any type of transport mounted with tires. An exemplary vehicle, used to illustrate several principles of the invention, is a construction vehicle such as a truck. This disclosure is not so limited, however, and is also directed to other vehicles such as ground vehicles, amphibious vehicles, aircraft, or remote controlled vehicles.

As used herein, "chain" includes: 1) any type of apparatus secured to the exterior of a vehicle tire intended to prevent skidding and/or promote improved traction between the vehicle and the surface to be traversed; and 2) any type of apparatus for securing an asset or a load to a vehicle (e.g., such would be used to secure freight to the bed of a truck or tractor-trailer). Exemplary chains include conventional round link chains, which may be connected in a linked and/or a net-like structure. Chains may be comprised of one or more of steel, iron, woven fabrics, resins, and other suitable materials known to one of ordinary skill in the art. The typical dimensions of load bearing chains include either 25 foot length ½ inch width or 30 foot length ⅜ inch width. The inventive chain retention device may be configured so as to receive chains of the aforementioned typical dimensions as well as other dimensions.

Figure 1A:
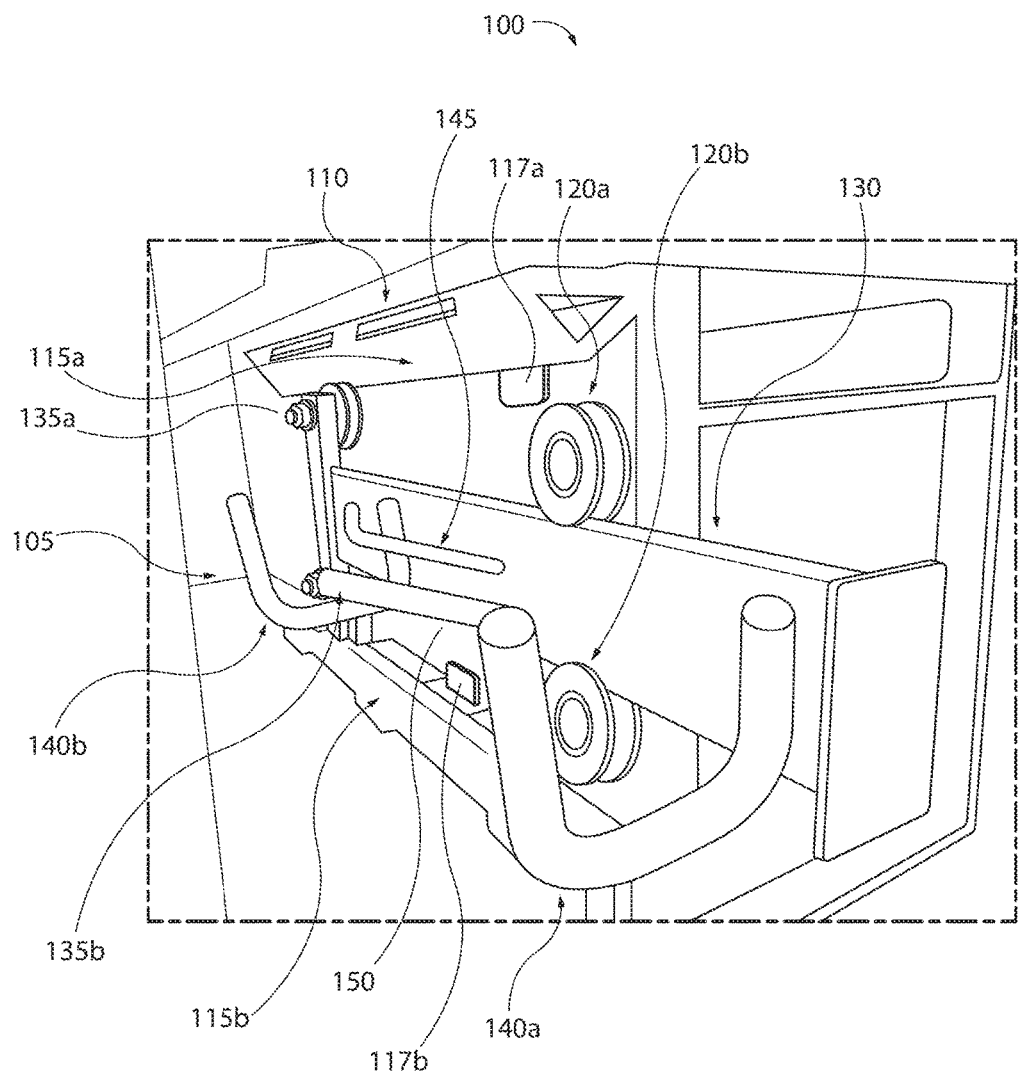
FIG. 1a is a schematic of a chain retention device in a partially extended position in accordance with aspects of the present invention.
Figure 1B:
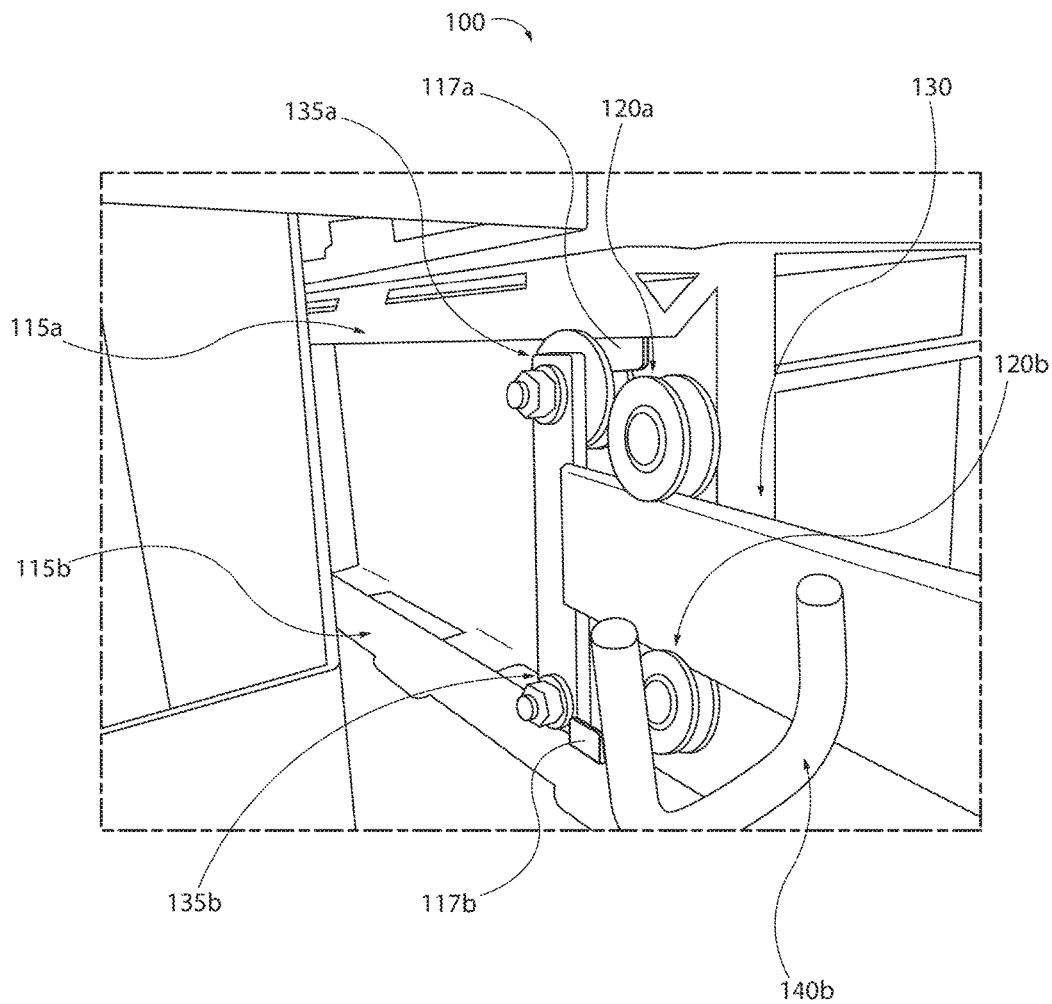
FIG. 1b is a schematic of a chain retention device in a fully extended position in accordance with aspects of the present invention.

FIGS. 1a and 1b depict an exemplary chain retention device 100 according to the present invention.

With reference to FIG. 1a, chain retention device 100 includes a track member 110 mounted at juncture 105 to on an external surface of a vehicle. Chain retention device 100 may be permanently (e.g. through welding and bolting) or temporarily (e.g., through bolting) mounted to the external surface of a vehicle. It may be desirable, for example, to remove chain retention device 100 to reduce the load (and thereby save fuel) on a tractor trailer during travel where traction is not expected to be a problem.

In the depicted embodiment, track member 110 is depicted as formed from a steel "I" beam, though other configurations and starting materials will become apparent to one of ordinary skill in the art upon reading this disclosure and considering the various embodiments disclosed herein. Track member 110 includes at least two guide surfaces 115 a,b which extend for a distance, d, along track member 110. In the depicted embodiment, at least two guide surfaces 115 a,b are arranged in an opposing configuration (i.e., the edges of the guide surfaces are facing each other), but the guide surfaces may be arranged in an unopposed configuration (i.e., where the surfaces are both facing away from each other or in the same direction) without deviating from the scope of the present invention. Track member 110 further includes a first set of rollers 120 a,b which may be located between the at least two guide surfaces 115 a,b.

Chain retention device 100 also includes an elongated arm 130 which has a second set of rollers 135 a,b and one or more hooks 140 a,b mounted thereon. Elongated arm 130 is positioned between the at least two guide surfaces 115 a,b such that second set of rollers 135 a,b is in contact with track member 110, and first set of rollers 120 a,b is in contact with elongated arm 130.

One or more chain support surfaces are sized and shaped to receive at least one set of chains per hook. In this particular embodiment, hooks 140 a,b may be used to receive tire chains.

In operation, first set of rollers 120 a,b and second set of rollers 135 a,b permit movement of elongated arm 130 relative to track member 110 and along at least two guide surfaces 115 a,b from a retracted position to an extended position. The final extended position may be reached when second set of rollers 135 a,b contact first set of rollers 120 a,b or, alternatively, one or more wheel stops 117 a,b. Wheel stops may alternatively or additionally be located on elongated arm 130 between first set of rollers 120 a,b and second set of rollers 135 a,b.

In one embodiment, second set of rollers 135 a,b are in direct contact with and traverse at least two guide surfaces 115 a,b. The edges of at least two guide surfaces 115 a,b and second set of rollers 135 a,b may form a tongue in groove configuration as depicted in FIG. 1a. Similarly, as depicted in FIG. 1a, first set of rollers 120 a,b and the edges of elongated arm 130 may form a tongue in groove configuration.

The extended position, depicted in FIG. 1b, permits ease of access to one or more hooks 140 a,b for loading and unloading of tire chains. A fully extended position is reached when first set of rollers 120 a,b contact second set of rollers 135 a,b. Alternatively, a set of wheel stops may be installed on at least two guide surfaces 115 a,b to prevent contact between first set of rollers 120 a,b and second set of rollers 135 a,b. The wheel stops may thus prevent contact-based wear and damage to first set of rollers 120 a,b and second set of rollers 135 a,b. In one embodiment, handle 150 permits a user to operate chain retention device 100 between retracted and extended positions. Handle 150 may be used to extend elongated arm 130 to a fully extended position. Once extended, tire chains may be added to one or more hooks a,b. After loading, the user may then push handle 150 inwardly towards the vehicle to retract elongated arm 130 to a retracted position.

It may be desirable to restrain elongated arm 130 from movement during transit and when a user is not loading or unloading chains from chain retention device 100. In the depicted embodiment, a spring-loaded pin 145 is operable by a user to secure elongated arm 130 in a retracted position to track member 110. Spring-loaded pin 145 passes through elongated arm 130 and into a hole (not shown) in the surface of track member 110, when elongated arm 130 is in a retracted position and spring-loaded pin 145 and the hole are aligned. When a user wishes to extend elongated arm 130, spring-loaded pin may be pulled out of the hole in track member 110, thereby permitting relative movement of elongated arm 130. One of ordinary skill in the art will understand that a variety of means, including latches, pins, and wheel stops may be used to render elongated arm 130 stationary and in a retracted position when not in use.

In certain embodiments, handle 150 is unnecessary as the extension and retraction of elongated arm 130 may be accomplished spring-loading or may be otherwise automated through, e.g., pneumatic devices.

The retracted position, in which first set of rollers 120 a,b are located at a maximum distance from second set of rollers 135 a,b, corresponds to the storage position. As described above, a latch or other means to prevent or interrupt relative movement between elongated arm 130 and track member 110 may be employed to lock chain retention device 100 in a retracted position during transit. The storage position may be used to store the chains on the vehicle during nonuse periods, including during transit.

Figure 2:
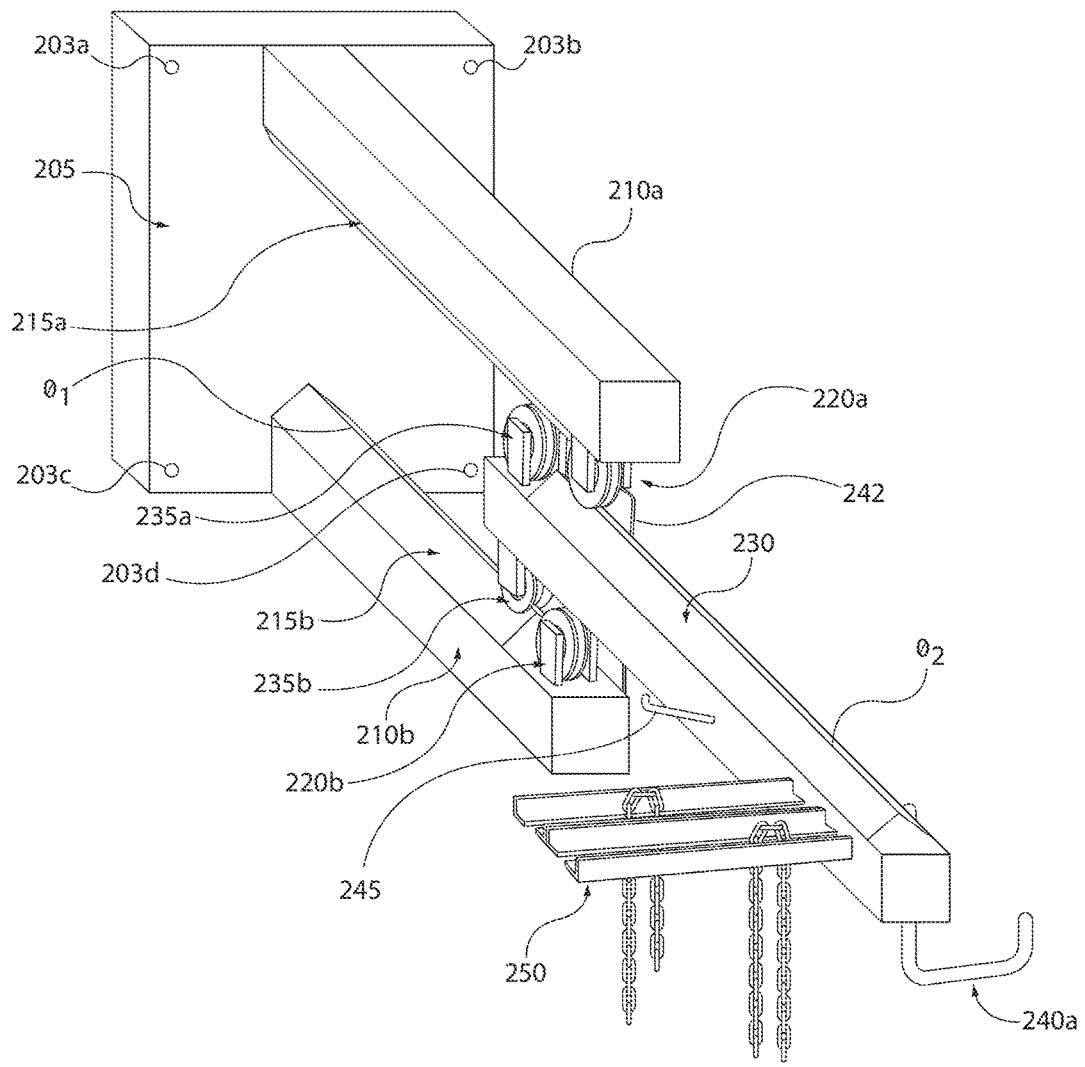
FIG. 2 is a schematic of a chain retention device in accordance with aspects of the present invention.

FIG. 2 depicts an alternative and exemplary chain retention device 200 according to the present invention.

Chain retention device 200 includes a support base 205 which may be mounted on and anchored to an external surface of a vehicle (not shown). Support base 205 may be mounted to any external surface of vehicle which can bear the combined weight of chain retention device 200 as well as any stored chains. As an example, support base 205 may be mounted to the frame of a vehicle (such as a beam frame member on a tractor trailer). Preferably, the chain retention device is mounted on a secure and inconspicuous location. Support base 205 may be affixed to the external surface of a vehicle using conventional means such as lag bolts, welding, etc. or any combination thereof.

Two support members 210 *a,b* have proximal ends extending from support base 205. Support members 210 *a,b* are oriented in substantially parallel relationship to each other. Support members 210 *a,b* may be fixedly attached to support base 205 through welding and/or bolting. As shown, support members 210*a,b* extend perpendicularly from support base 205.

Each support member 210 *a,b* includes a guide surface 215 *a,b* and a support roller 220 *a,b*. Guide surfaces 215 *a,b* may extend for less than the full distance of the support members 210 *a,b*, and support rollers 220 *a,b* may be located at the distal ends of support members 210 *a,b*. Guide surfaces 215 *a,b* may be arranged in an opposing configuration (i.e., the edges of the guide surfaces are facing each other).

Alternatively, support members 210 *a,b* may be maintained in fixed relationship by a connecting member 242. In one embodiment, connecting member 242 is a strip of steel that passes behind support rollers 220 *a,b* to connect together support members 210 *a,b*.

Chain retention device 200 further includes an elongated arm 230 having a set of rollers 235 *a,b* and one or more chain support surfaces (here, both hooks 240 *a* and slides 250 are shown) for receiving chains mounted thereon. Slides 250 may be preferable for receiving chains of significantly longer length than tire chains, and may be held in a "looped" manner along the slide as depicted in FIG. 2. As shown, set of rollers 235 *a,b* contact the guide surfaces 215 *a,b* themselves or alternatively, both the guide surfaces 215 *a,b* and the surface of support members 210 *a,b* opposite guide surfaces 215 *a,b*.

Support rollers 220 *a,b* contact elongated arm 230 to maintain elongated arm 230 between support members 210 *a,b*.

In one embodiment, depicted in FIG. 2, guide surface 215 *a,b* may have an angle, $\theta_1$, configured to accept and retain elongated arm 230 or a portion thereof. In the depicted embodiment, guide surfaces 215 *a,b* contact rollers 235 *a,b* and, thereby, retain elongated arm 230. Elongated arm may have an equally or differently angled surface, $\theta_2$, configured to mate with support rollers 220 *a,b*. Other configurations to retain elongated arm 230 in contact with guide surfaces 215 *a,b*, such as tongue and groove, will become apparent to one of ordinary skill in the art upon reviewing this disclosure.

In another embodiment, elongated arm 230 includes a plurality of hooks 240 *a,b* for receiving tire chains and slides 250 for receiving load bearing chains. Depending on the type of connecting member 250 used, hooks and slides may be mounted on one or both sides of elongated arm 230 (whereas the "I-beam" configuration described in FIGS. 1*a* and 1*b* may be limited to a single side of the elongated arm due to the potential interference between the hooks/slides and the I-beam or connecting member 242). One of ordinary skill in the art will understand that connecting member 242 can be configured so as to avoid interference with hooks and slides positioned on the same side of elongated arm 230 as connecting member 242.

Elongated arm may also include support surfaces for attaching various related accessories such as flash lights and tools for affixing and removing tire chains to the tire of a vehicle as well as tools for employing load bearing chains (e.g., load binder hangers).

Similar to the operation of the first embodiment above, support rollers 220 *a,b* and set of rollers 235 *a,b* permit movement of elongated arm 230 relative to support members 210 *a,b* and along guide surfaces 215 *a,b* from a retracted position to an extended position. A fully extended position may be reached when support rollers 220 a,b contact set of rollers 235 *a,b* or, alternatively one or more wheel stops (such as wheel stops 117 *a,b* as shown in FIG. 1).

Elongated arm 230 may also be rendered in a locked position during transit and when a user is not loading or unloading chains from chain retention device 200. In the depicted embodiment, a spring-loaded pin 245 is operable by a user to secure elongated arm 230 in a retracted position to connecting member 242. Spring-loaded pin 245 passes through elongated arm 230 and into a hole (not shown) in the surface of connecting member 242, when elongated arm 230 is in a retracted position and spring-loaded pin 245 and the hole are aligned. When a user wishes to extend elongated arm 230, spring-loaded pin may be pulled out of the hole in connecting member 242, thereby permitting relative movement of elongated arm 230.

Figure 3A:
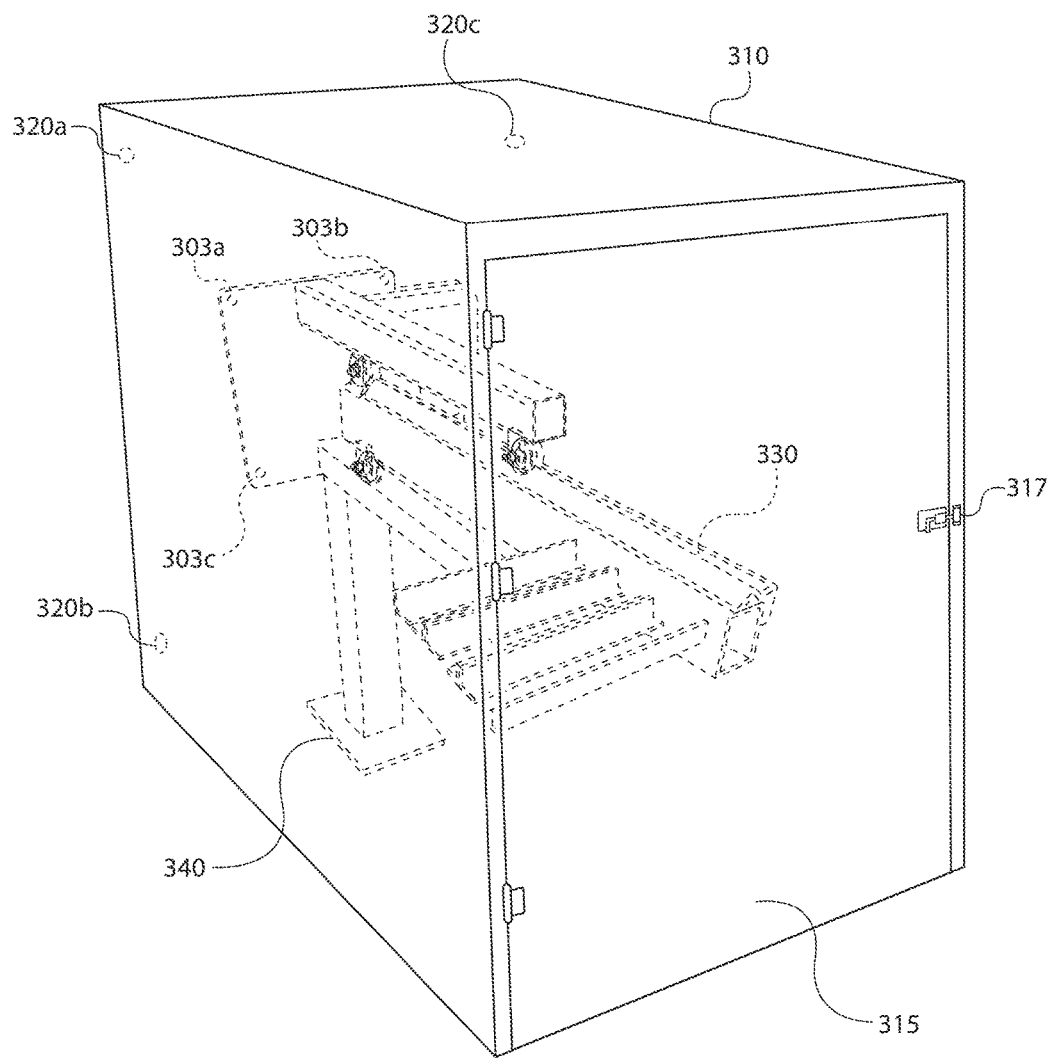
FIG. 3a is a schematic of a chain retention device retracted within an enclosure in accordance with aspects of the present invention.

Turning now to FIGS. 3*a* and *b*, schematics of a chain retention device secured within an enclosure in accordance with aspects of the present invention are depicted. The enclosure 310 may completely or partially surround either of chain retention device 100 or chain retention device 200. Enclosure 310 mitigates or prevents unauthorized tampering with tire chains stored therein by, firstly, obscuring tire chains from visibility. Enclosure 310 also shields stored tire chains from environmental exposure and the accumulation of moisture and sediment during transit. Perhaps equally as important, enclosure 310 shields the vehicle from damage by stored chains. For example, unrestrained chains stored between the fuel tank and the front rear tires of a semi can cause significant damage to both structures.

Bolt holes 303 *a,b,c* may be used to drive bolts (not depicted) into the vehicle frame as one means of securing enclosure 310. Alternatively, or in addition to bolting, enclosure 310 may be welded to the desired portion of the vehicle. In one embodiment, enclosure 310 may be mounted between the fuel tank and the rear front wheel of a semi. Other mounting positions/configurations are possible. For example, chain retention device 300 may be mounted by bolting and/or welding mount 340 to the flat bed of a truck. Enclosure 310 may be secured to any conveniently accessible portion of a vehicle (e.g., a truck frame) through a variety of conventional means which will be apparent to one skilled in the art upon reading this disclosure.

Conveniently, enclosure 310 may including a door 315 for accessing the elongated arm 330. Door 315 may include a locking mechanism 317 or other means for securing door 315 from accidentally opening during transit or from unwanted tampering with or access to The chain retention device.

Figure 3B:
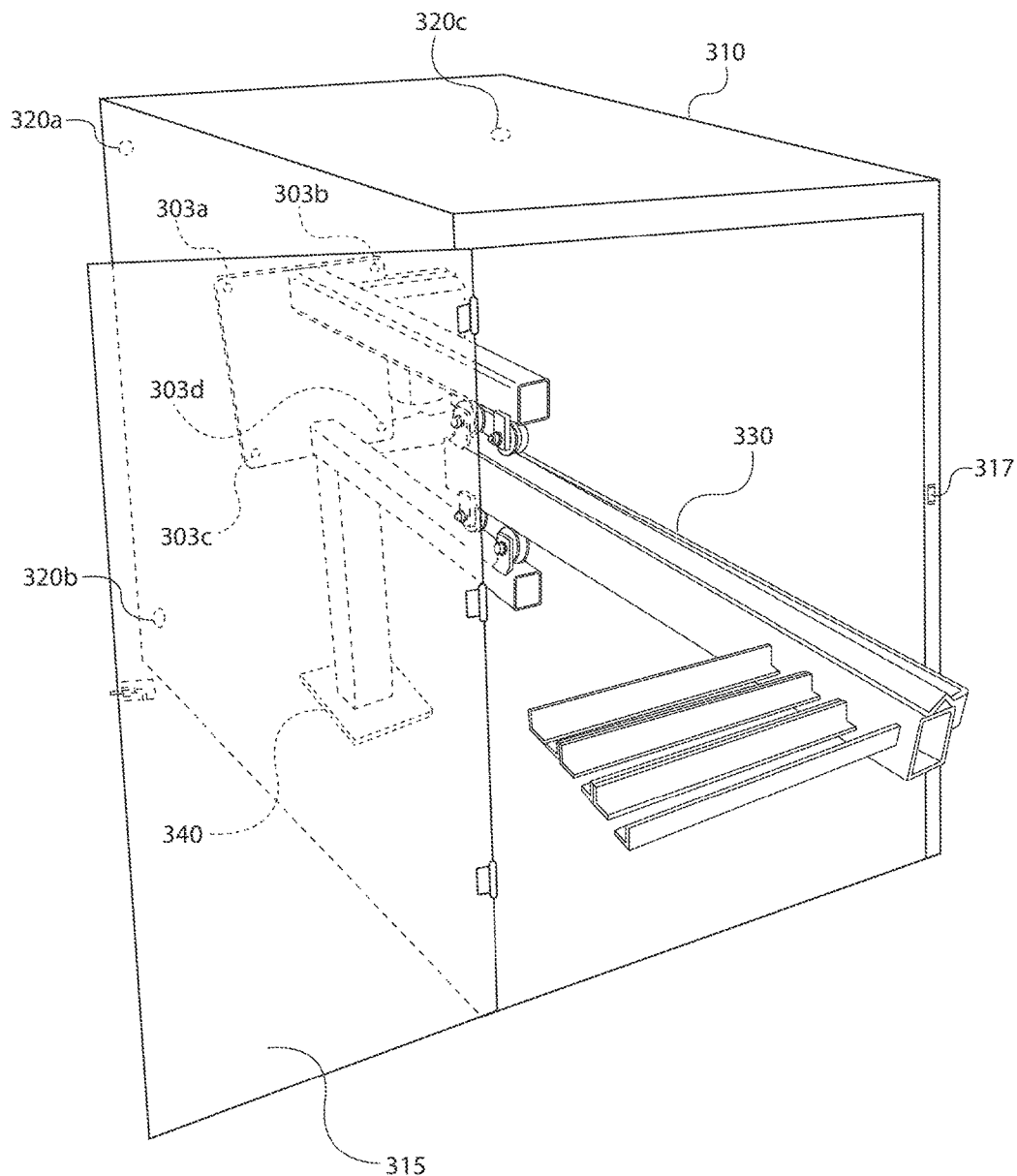
FIG. 3b is a schematic of a chain retention device extended out of an enclosure in accordance with aspects of the present invention.

Door 315 may be opened to extend elongated arm 330 to an extended position. FIG. 3*b* depicts elongated arm 330 extended beyond the plane of door 315. As described above, the extended position permits ease of access to The chain retention device and allows loading and unloading of tire chains. Door 315 may be closed once elongated arm 330 is in a retracted position. FIG. 3*a* depicts elongated arm 330 in a retracted position, permitting door 315 to be closed.

Due to the particular configuration of rollers and guide surfaces, The chain retention devices described herein are particularly robust, and able to bear the significant load associated with the tire chains, even when the elongated arm (e.g., elongated arm 130) is in a fully extended position. Moreover, the configuration permits a single operator with the ability to load and unload tire chains with ease. Finally, the enclosure (e.g., enclosure 300) provides a palatable alternative to securing the tire chains within the cab/interior of the vehicle.

Although the invention is illustrated and described herein with reference to specific embodiments, the invention is not intended to be limited to the details shown. Rather, various modifications may be made in the details within the scope and range of equivalents of the claims and without departing from the invention.

What is claimed is:

1. A chain retention device for a vehicle comprising:
    a track member that is configured to be mounted on an external surface of the vehicle, the track member including at least two guide surfaces which face each other and extend along the track member and a first set of rollers mounted on the track member between the at least two opposing guide surfaces; and
    an elongated arm that is slidably mounted on the track member along an axis, the elongated arm including a second set of rollers and one or more chain support surfaces for supporting a chain, wherein rollers of the second set of rollers are spaced apart from the axis,
    wherein the elongated arm is positioned between the at least two guide surfaces such that the second set of rollers is in contact with the track member, and the first set of rollers is in contact with the elongated arm.

2. The chain retention device of claim 1, wherein the first and second set of rollers permit sliding movement of the arm along the guide surfaces to an extended position.

3. The chain retention device of claim 1, wherein the second set of rollers is in contact with the at least two guide surfaces.

4. The chain retention device of claim 1 further comprising an enclosure for at least partially enclosing the track member and the elongated arm, the enclosure including a door for accessing the elongated arm.

5. The chain retention device of claim 4, wherein the door comprises a lock for preventing unauthorized access to the enclosure.

6. The chain retention device of claim 5, wherein the door is opened when the arm is in an extended position, and the door may be closed when the arm is in a retracted position.

7. The chain retention device of claim 1, wherein the guide surfaces each form an angled edge for receiving the second set of rollers, and wherein the angled edges are inwardly facing.

8. The chain retention device of claim 1, wherein the one or more chain support surfaces include a hook, a slide, or a combination thereof.

9. A chain retention device for a vehicle comprising:
    a support base that is configured to be mounted to an external surface of a vehicle,
    two support members having proximal ends extending from the support base, the support members being oriented parallel to each other, each support member including a guide surface and a support roller, wherein the guide surfaces of the two support members face each other; and
    an elongated arm that is slidably mounted on the two support members along an axis, the elongated arm including a set of rollers and one or more chain support surfaces for supporting a chain, wherein rollers of the set of rollers are spaced apart from the axis;
    wherein the set of rollers contact the guide surfaces of the two support members and the support rollers contact the elongated arm, thereby maintaining the elongated arm between the two support members.

10. The chain retention device of claim 9, wherein the one or more chain support surfaces include a hook, a slide, or a combination thereof.

11. The chain retention device of claim 9, wherein the guide surfaces extend for less than a full distance of the support members, and the support rollers are located at distal ends of the support members.

12. The chain retention device of claim 9, wherein the guide surfaces each form an angled edge on the support member for contacting the set of rollers.

13. The chain retention device of claim 9, wherein the set of rollers permits movement of the elongated arm along the guide surfaces to an extended position.

14. The retention device of claim 13, wherein a fully extended position of the elongated arm is reached when the set of rollers contact one or more wheel stops.

15. The chain retention device of claim 9 further comprising an enclosure for enclosing the support members and the elongated arm, the enclosure including a door for accessing the elongated arm.

16. The chain retention device of claim 15, wherein the enclosure is mounted to the support base.

17. The chain retention device of claim 15, wherein the door comprises a lock for preventing unauthorized access to the enclosure.

18. The chain retention device of claim 15, wherein the door is moveable between (i) an opened position to accommodate the elongated arm in an extended position, and (ii) a closed position to conceal the elongated arm in a retracted position.

19. The chain retention device of claim 9, wherein the elongated arm includes a plurality of hooks.

20. The chain retention device of claim 9, further comprising a handle on the elongated arm for extending and retracting the arm.

21. The chain retention device of claim 9, wherein the set of rollers contact the guide surfaces.

22. The chain retention device of claim 9, wherein the one or more chain support surfaces are located on opposing sides of the elongated arm.

* * * * *